United States Patent
Coimbatore Annadorai et al.

(10) Patent No.: US 11,966,588 B2
(45) Date of Patent: Apr. 23, 2024

(54) FLASH MEMORY USAGE MANAGEMENT

(71) Applicant: Google LLC, Mountain View, CA (US)

(72) Inventors: Lakshman Naresh Coimbatore Annadorai, San Mateo, CA (US); Keun Young Park, Santa Clara, CA (US); Dongkyun Jeong, Palo Alto, CA (US); Matthew William Crowley, Los Altos, CA (US); Fábio Marconato Sasso, Oakland, CA (US); Edward Dcruz, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/511,036

(22) Filed: Oct. 26, 2021

(65) Prior Publication Data
US 2023/0131825 A1    Apr. 27, 2023

(51) Int. Cl.
*G06F 3/06* (2006.01)

(52) U.S. Cl.
CPC .......... *G06F 3/0616* (2013.01); *G06F 3/0619* (2013.01); *G06F 3/0653* (2013.01); *G06F 3/0659* (2013.01); *G06F 3/0679* (2013.01)

(58) Field of Classification Search
CPC .... G06F 3/0616; G06F 3/0619; G06F 3/0653; G06F 3/0659; G06F 3/0679
See application file for complete search history.

(56) References Cited

U.S. PATENT DOCUMENTS

| | | | |
|---|---|---|---|
| 10,264,064 B1 * | 4/2019 | Dantkale | H04L 67/1095 |
| 11,481,261 B1 * | 10/2022 | Frandzel | G06F 9/4881 |
| 11,829,258 B2 | 11/2023 | Murakami et al. | |
| 2012/0102504 A1 | 4/2012 | Iyer et al. | |
| 2012/0233624 A1 | 9/2012 | Niimura | |
| 2014/0223074 A1 | 8/2014 | Li et al. | |
| 2017/0133107 A1 | 5/2017 | Ryan et al. | |
| 2018/0032982 A1 * | 2/2018 | Takeuchi | G06Q 20/145 |
| 2018/0129537 A1 * | 5/2018 | Kurtzman | G06F 9/5083 |
| 2018/0349261 A1 | 12/2018 | Desai et al. | |
| 2019/0066424 A1 * | 2/2019 | Hassani | B60R 25/252 |
| 2019/0179544 A1 | 6/2019 | Rothberg | |

(Continued)

FOREIGN PATENT DOCUMENTS

| | | | |
|---|---|---|---|
| JP | 2020062759 A | 4/2020 | |
| JP | 2021005210 A | 1/2021 | |

OTHER PUBLICATIONS

Linux Foundation, "Automotive Grade Linux Requirements Specification" May 28, 2015, 159 pp.

(Continued)

*Primary Examiner* — Nanci N Wong
(74) *Attorney, Agent, or Firm* — Shumaker & Sieffert, P.A.

(57) ABSTRACT

A computing device may determine a respective disk access usage of flash memory of the computing device by each of a plurality of applications. The computing device may compare the respective disk access usage of the flash memory by each of the plurality of applications with a respective application-specific disk access overuse threshold to determine disk access overuse of the flash memory by an application of the plurality of applications. The computing device may, in response to determining the disk access overuse of the flash memory by the application, terminate the application.

20 Claims, 5 Drawing Sheets

(56) References Cited

U.S. PATENT DOCUMENTS

2019/0347050 A1* 11/2019 Sung .................. G06F 9/44505
2021/0191734 A1 6/2021 Myrick et al.

OTHER PUBLICATIONS

Google Android, "Flash Wear Management in Android Automotive" retrieved from, https://source.android.com/devices/tech/perf/flash-wear, Oct. 26, 2021, 4pp.
Kai Ren, "Fast Storage for File System Metadata", Sep. 26, 2017, 165 pp.
Google Android, "Car Watchdog" retrieved from, https://source.android.com/devices/automotive/vhal/car_watchdog, Oct. 26, 2021, 9 pp.
Google Android, "Garage Mode" retrieved from, https://source.android.com/devices/automotive/power/garage_mode, Oct. 26, 2021, 4 pp.
Extended Search Report from counterpart European Application No. 22197241.7 dated Mar. 23, 2023, 8 pp.
First Examination Report from counterpart Indian Application No. 202244057201 dated Aug. 30, 2023, 7 pp.
Response to Extended Search Report dated Mar. 23, 2023, from counterpart European Application No. 22197241.7 filed Oct. 17, 2023, 21 pp.
Response to First Examination Report dated Aug. 30, 2023, from counterpart Indian Application No. 202244057201 filed Nov. 21, 2023, 19 pp.
Office Action, and translation thereof, from counterpart Japanese Application No. 2022-168445 dated Feb. 6, 2024, 5 pp.

* cited by examiner

FLASH MEMORY USAGE MANAGEMENT

BACKGROUND

A vehicle may include a so-called "head unit" or other integrated computing device that presents an interface (such as a graphical user interface—GUI) by which to control the vehicle systems, such as a heating, ventilation, and air conditioning (HVAC) system, a lighting system (for controlling interior and/or exterior lights), an entertainment system, a seating system (for controlling a position of a driver and/or passenger seat), etc.

The head unit may include one or more solid state storage devices (which may also be referred to as "flash memory") to which the head unit may write data and from which the head unit may read data during operation of the head unit. A solid state storage device may be made up of cells, such as NOT-AND ("NAND") cells. When a cell is currently storing data, the cell must be erased before new data is written to the cell. Such erasing and writing of data is referred to as an erase cycle and may cause cell wear and impose a limited write life to cells of the solid state storage device. For example, a solid state storage device may have a maximum number of erase cycles of 3,000 to 10,000 erase cycles per cell.

The lifespan of a solid state storage device may be dependent on the maximum number of erase cycles of cells of the solid state storage device and the storage capacity of the solid state storage device because cells of a solid state storage device having a higher capacity may experience fewer erase cycles than cells of a solid state storage device having a lower capacity. For example, the lifespan of a solid state storage device in years can be $$\text{lifespan} = \frac{\text{maximum number of erase cycles} * \text{storage capacity}}{\text{amount of data written per year}}.$$

SUMMARY

In general techniques of this disclosure are directed to enabling a vehicle computing device (such as a vehicle head unit) to manage the usage of the solid state storage device, such as flash memory of the vehicle computing device in ways that improves the longevity of the solid state storage device. That is, the vehicle computing device may be able to limit the amount of data that can be written to the flash memory of the vehicle computing device by an application executing at the vehicle computing device within a specified time period.

Specifically, the vehicle computing device may monitor the disk access usage, such as the amount of data written to the flash memory of the vehicle computing device, within a specified time period, such as within a day, by each of a plurality of applications, such as Java Applications, Java services, and C++ services, that executes at the vehicle computing device. The vehicle computing device may compare the respective amount of data written to the flash memory by each of the plurality of applications to a respective application-specific disk usage threshold. If the vehicle computing device determines that the disk access usage of an application during the specified time period exceeds the application-specific disk usage threshold, the vehicle computing device may determine that the application is overusing disk access of the flash memory, and may take one or more actions, such as terminating the application, flagging the overuse of disk access of the flash memory, generate a notification indicative of the application overusing disk access of the flash memory, and the like. The vehicle computing device may also disable the application until the end of the specified time period, such as until the end of the day, thereby preventing the application from writing additional data to the flash memory until the end of the specified time period, thereby preventing further overuse of disk access of the flash memory by the application.

The techniques of this disclosure provide one or more technical advantages. By determining an amount of data that an application is allowed to write to flash memory within a specified period of time and disabling applications that write more than the allowed amount of data to the flash memory during the specified period of time, the techniques of this disclosure limits applications from writing an excessive amount of data to the flash memory. Flash memory installed in a vehicle head unit may be difficult and costly to replace. When the flash memory of a vehicle head unit reaches the end of its lifespan, the flash memory may fail and render the vehicle head unit inoperable or otherwise unusable. Preventing applications from writing an excessive amount of data to the flash memory may help to preserve the lifespan of flash memory, thereby also increasing the usable life of vehicle head units that use flash memory, providing a technical advantage.

In one example, this disclosure describes a method includes determining, by one or more processors of a computing device, a respective disk access usage of flash memory of the computing device by each of a plurality of applications; comparing, by the one or more processors, the respective disk access usage of the flash memory by each of the plurality of applications with a respective application-specific disk access overuse threshold to determine disk access overuse of the flash memory by an application of the plurality of applications; and in response to determining the disk access overuse of the flash memory by the application, terminating, by the one or more processors, the application.

In another example, this disclosure describes a computing device includes flash memory; and one or more processors communicably coupled to the flash memory and configured to: determine a respective disk access usage of the flash memory by each of a plurality of applications; compare the respective disk access usage of the flash memory by each of the plurality of applications with a respective application-specific disk access overuse threshold to determine disk access overuse of the flash memory by an application of the plurality of applications; and in response to determining the disk access overuse of the flash memory by the application, terminate the application.

In another example, this disclosure describes a non-transitory computer-readable storage medium having stored thereon instructions that, when executed, cause one or more processors of a computing device to: compare the respective disk access usage of the flash memory by each of the plurality of applications with a respective application-specific disk access overuse threshold to determine disk access overuse of the flash memory by an application of the plurality of applications; and in response to determining the disk access overuse of the flash memory by the application, terminate the application.

The details of one or more examples are set forth in the accompanying drawings and the description below. Other features, objects, and advantages of the disclosure will be apparent from the description and drawings, and from the claims.

DETAILED DESCRIPTION

Figure 1:
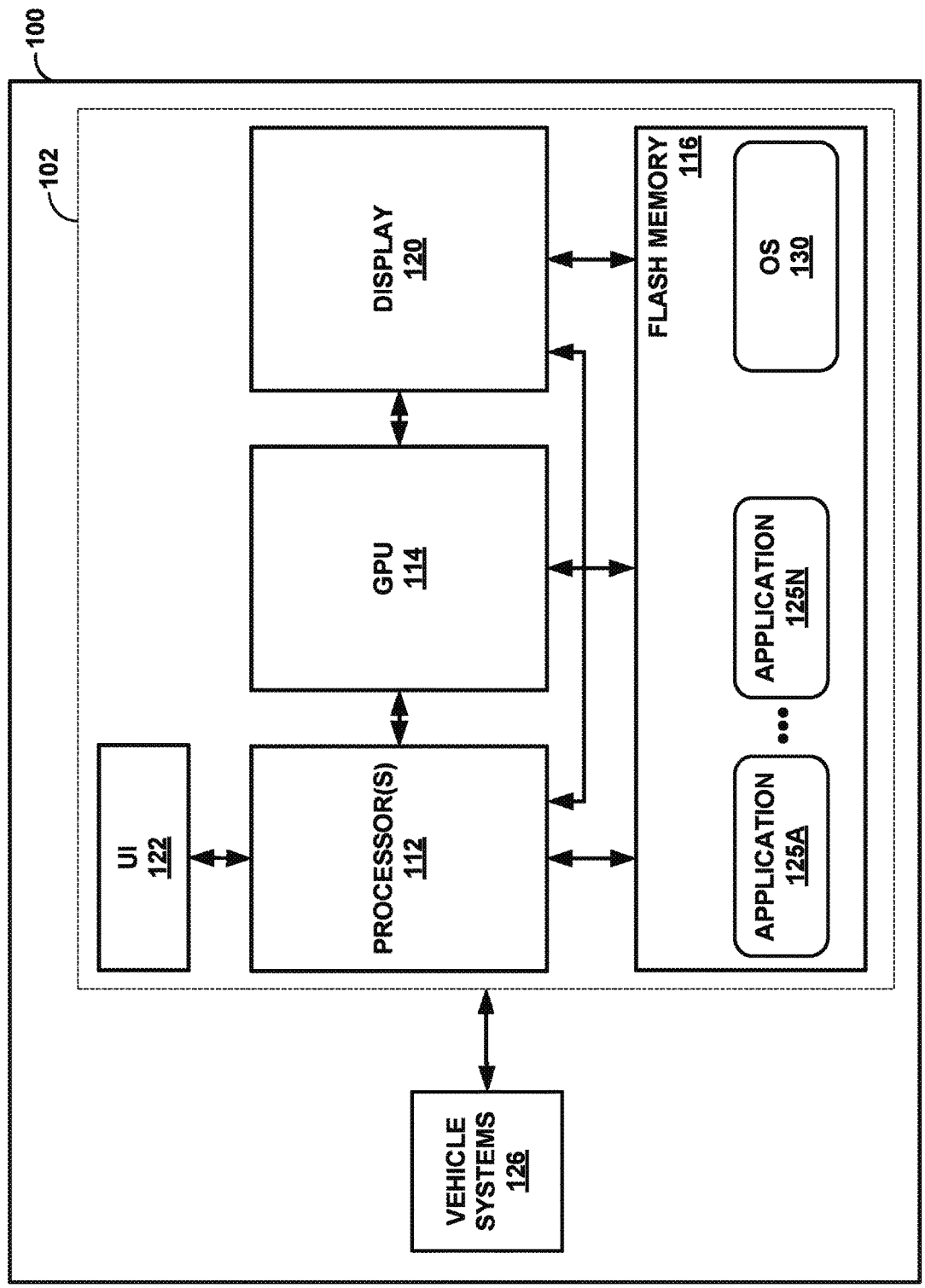
FIG. 1 is a block diagram illustrating an example vehicle configured to perform various aspects of the techniques described in this disclosure.

FIG. 1 is a block diagram illustrating an example vehicle 100 configured to perform various aspects of the techniques described in this disclosure. In the example of FIG. 1, vehicle 100 is assumed in the description below to be an automobile. However, the techniques described in this disclosure may apply to any type of vehicle capable of conveying one or more occupants between locations, such as a motorcycle, a bus, a recreational vehicle (RV), a semi-trailer truck, a tractor or other type of farm equipment, a train, a plane, a drone, a helicopter, a personal transport vehicle, and the like. In addition, the techniques described in this disclosure may also apply to any type of computing devices, such as laptop computers, desktop computers, smart phones, wearable devices, tablet computers, or any other device that includes flash memory.

In the example of FIG. 1, vehicle 100 includes one or more processors 112, a graphics processing unit (GPU) 114, and flash memory 116. In some examples, one or more processors 112, GPU 114, and a transceiver module (not shown in FIG. 1) may be formed as an integrated circuit (IC). For example, the IC may be considered as a processing chip within a chip package, and may be a system-on-chip (SoC).

Examples of one or more processors 112, and GPU 114 include, but are not limited to, one or more digital signal processors (DSPs), general purpose microprocessors, application specific integrated circuits (ASICs), field programmable logic arrays (FPGAs), or other equivalent integrated or discrete logic circuitry. One or more processors 112 may represent a central processing unit (CPU) of vehicle 100. In some examples, GPU 114 may be specialized hardware that includes integrated and/or discrete logic circuitry that provides GPU 114 with massive parallel processing capabilities suitable for graphics processing. In some instances, GPU 114 may also include general purpose processing capabilities, and may be referred to as a general purpose GPU (GPGPU) when implementing general purpose processing tasks (i.e., non-graphics related tasks). Although shown as a dedicated GPU 114, GPU 114 may represent an integrated GPU that is integrated into the underlying circuit board (such as a so-called "motherboard"), or otherwise incorporated into one or more processors 112.

One or more processors 112 may execute various types of applications. Examples of the applications include navigation applications, such as mapping applications that caches offline map tiles in flash memory 116, music applications, such as music applications that download music files onto flash memory 116, video applications, such as video applications that download video files onto flash memory 116, dashcam applications that stores captured video files onto flash memory 116, over the air (OTA) update applications that write large files to flash memory 116, or other applications that generate viewable objects for display. Flash memory 116 may act as system memory for head unit 102 and may store instructions for execution of the one or more applications. The execution of an application by one or more processors 112 causes one or more processors 112 to produce graphics data for image content that is to be displayed. One or more processors 112 may transmit graphics data of the image content to GPU 114 for further processing based on instructions or commands that one or more processors 112 transmits to GPU 114. In some examples, one or more processors 112 may also execute applications that do not generate viewable objects for display. For example, one or more processors 112 may execute background services, such as background services that act as core components for other applications that do generate viewable objects for display.

One or more processors 112 may communicate with GPU 114 in accordance with an application programming interface (API). Moreover, the techniques described in this disclosure are not required to function in accordance with an API, and one or more processors 112 and GPU 114 may utilize any technique for communicating with GPU 114.

Flash memory 116 may represent a memory for vehicle 100. Flash memory 116 may comprise one or more computer-readable storage media. Examples of flash memory 116 include one or more solid state storage devices that can be used to carry or store desired program code in the form of instructions and/or data structures and that can be accessed by a computer or a processor.

In some aspects, flash memory 116 may include instructions that cause one or more processors 112 to perform the functions ascribed in this disclosure to one or more processors 112. Accordingly, flash memory 116 may be a non-transitory computer-readable storage medium having instructions stored thereon that, when executed, cause one or more processors (e.g., one or more processors 112) to perform various functions.

Flash memory 116 is a non-transitory storage medium. The term "non-transitory" indicates that the storage medium is not embodied in a carrier wave or a propagated signal. However, the term "non-transitory" should not be interpreted to mean that flash memory 116 is non-movable or that its contents are static. As one example, flash memory 116 may be removed from vehicle 100, such as in the case of a Secure Digital (SD) card or a Universal Serial Bus (USB) mass storage device, and moved to another device. As another example, memory, substantially similar to flash memory 116, may be inserted into autonomous vehicle 100. In certain examples, a non-transitory storage medium may store data that can, over time, change.

As shown in FIG. 1, vehicle 100 may include vehicle systems 126. Vehicle systems 126 may include a heating, ventilation, air conditioning (HVAC) system, a temperature regulation system (e.g., which may include heated and/or cooled seats in addition to the HVAC system), a lighting system (for providing interior and/or exterior lighting), a seat control system (for adjusting a position of occupant seating), a mirror control system (for controlling interior and/or exterior mirrors, including rearview mirrors, side mirrors, visor mirrors, etc.), a windshield wiper control system, an entertainment system (for controlling radio playback, video playback, image display, etc.), a safety assistant system (for controlling parking assistance, back-up assistance, etc.), a sun-/moon-roof control system (for controlling sunroofs and/or moonroofs), and any other type of vehicle system capable of control via a one or more processors 112. An example of vehicle systems 126 may include an electronic control unit (ECU), which may control any of the foregoing examples of vehicle systems 126.

As further shown in the example of FIG. 1, vehicle 100 may include a display 120 and a user interface 122. Display 120 may represent any type of passive reflective screen on which images can be projected, or an active reflective or emissive or transmissive display capable of displaying images (such as a light emitting diode (LED) display, an organic LED (OLED) display, liquid crystal display (LCD), or any other type of active display). Although shown as including a single display 120, vehicle 100 may include a number of displays that may be positioned throughout a cabin of vehicle 100. In some examples, passive versions of display 120 or certain types of active versions of display 120 (e.g., OLED displays) may be integrated into seats, tables, roof liners, flooring, windows (or in vehicles with no windows or few windows, walls) or other aspects of the cabin of vehicles. When display 120 represents a passive display, display 120 may also include a projector or other image projection device capable of projecting or otherwise recreating an image on passive display 120. Furthermore, display 120 may include displays integrated into driver-side dashboards that virtually represent physical instrument clusters (showing speed, revolutions, engine temperature, etc.).

Display 120 may also represent displays in wired or wireless communication with autonomous vehicle 100. Display 120 may, for example, represent a computing device, such as a laptop computer, a heads-up display, a head-mounted display, an augmented reality computing device or display (such as "smart glasses"), a virtual reality computing device or display, a mobile phone (including a so-called "smart phone"), a tablet computer, a gaming system, or another type of computing device capable of acting as an extension of or in place of a display integrated into vehicle 100.

User interface 122 may represent any type of physical or virtual interface with which a user may interface to control various functionalities of vehicle 100. User interface 122 may include physical buttons, knobs, sliders or other physical control implements. User interface (UI) 122 may also include a virtual interface whereby an occupant of vehicle 100 interacts with virtual buttons, knobs, sliders or other virtual interface elements via, as one example, a touch-sensitive screen, or via a touchless interface. The occupant may interface with user interface 122 to control one or more of a climate within vehicle 100, audio playback by vehicle 100, video playback by vehicle 100, transmissions (such as cell phone calls) through vehicle 100, or any other operation capable of being performed by vehicle 100.

User interface 122 may also represent interfaces extended to display 120 when acting as an extension of or in place of a display integrated into vehicle 100. That is, user interface 122 may include virtual interfaces presented via a heads-up display (HUD), augmented reality computing device, virtual reality computing device or display, tablet computer, or any other of the different types of extended displays listed above.

In the context of vehicle 100, user interface 122 may further represent physical elements used for manually or semi-manually controlling vehicle 100. For example, user interface 122 may include one or more steering wheels for controlling a direction of travel of vehicle 100, one or more pedals for controlling a rate of travel of vehicle 100, one or more hand brakes, etc.

In the example of FIG. 1, one or more processors 112, GPU 114, flash memory 116, display 120, and user interface 122 may collectively represent, at least in part, what is referred to as a head unit 102 (or, in other words, a "vehicle head unit 102") in the automotive context. Head unit 102 may represent any integrated or separate computing device capable of interfacing with various aspects of vehicle 100 (e.g., vehicle systems 126) and/or providing entertainment for occupants and/or information regarding vehicle 100 (where such head units may be referred to as "infotainment units" or "infotainment systems").

Head unit 102 may execute an operating system ("OS") 130 that is configured to monitor the disk access usage, also referred to as disk input/output (I/O), of applications that execute at one or more processors 112 and to limit the amount of disk access usage by the applications within a specified time period, in order to extend the lifetime of flash memory 116. The disk access usage of an application may correspond to the amount of writes to flash memory 116 by the application. That is, in some examples, the amount of disk access usage of an application may be the amount of data, such as in bytes, written by the application to flash memory 116. OS 130 may monitor the amount of writes to flash memory 116 by each of the applications that execute at one or more processors 112 to determine whether the disk access usage by an application is too high. If OS 130 determines that the disk access usage by an application is too high, OS 130 may take one or more remedial actions to limit further disk access usage of the application, such as by terminating the application.

The kernel of OS 130 may track the disk access usage statistics of flash memory 116, such as the amount of data written to flash memory 116, and may store such disk access usage statistics of flash memory 116 in one or more files in flash memory 116. For example, the kernel may store and update a file in flash memory 116 that includes the number of sectors written on each block device of flash memory 116. In the example where OS 130 is a Linux operating system, such a file may be the/proc/diskstats file. The kernel may also track the per-application disk access usage statistics of flash memory 116, such as the amount of data written by each of applications 225 to flash memory 116, and may store and update a file in flash memory 116 that includes such per-application disk access usage statistics of flash memory 116. In the example where OS 130 is a Linux operating system, such a file may be the/proc/uid_io/stats file.

OS 130 may include a daemon that periodically determines the amount of disk access usage by all applications 125A-125N ("applications 125") that have executed at processors 112, such as by periodically polling the file in flash memory 116 that includes such per-application disk access usage statistics of flash memory 116, such as the/proc/uid_io/stats file. For example, the daemon may poll a/proc/uid_io/stats file to fetch per-UID disk/O stats. The/proc/uid_io/stats file may include per-UID disk I/O stats for all applications that have executed at processors 112 and not just the applications currently executing at one or more processors 112. Specifically, the/proc/uid_io/stats file may include, for each application, per-UID disk I/O stats, such as the number of bytes written by the application to flash memory 116. OS 130 may determine the disk access usage of each of the applications that executes at one or more processors 112 based on the per-UID disk I/O stats in the /proc/uid_io/stats file. For example, OS 130 may, for an application, determine the disk access usage of the application as the number of bytes written by the application to system flash memory.

OS 130 may determine whether each of applications 125 is overusing disk access of flash memory 116 within a specified period of time, such as within one day (e.g., from 12:00 AM to 11:59 PM of that day) by comparing each of applications 125 with an application-specific disk access overuse threshold that specifies, for an associated application, the amount of disk access of flash memory 116 that the application may use during the specified period of time. Each application of applications 125 may have a separate, application-specific disk access overuse threshold because different applications may have different memory access usage requirements. For example, a mapping application and a media application (e.g., a music streaming application) may tend to write more data to flash memory 116 than other applications, and may therefore each be associated with a higher disk access overuse threshold than other applications.

OS 130 may therefore compare the disk access usage of flash memory 116 by an application of applications 125 with an application-specific disk access overuse threshold associated with the application to determine whether the application is overusing disk access. If OS 130 determines that the amount of disk access of flash memory 116 used by an application of applications 125 exceeds the application-specific disk access overuse threshold associated with the application within the specified time period. OS 130 may determine that the application is overusing the disk access of flash memory 116.

For example, each of applications 125 may be associated with an application-specific disk access overuse threshold that specifies, for an associated application, the amount of data, such as in bytes, that the associated application may write to flash memory 116 during the specified time period. OS 130 may therefore compare the amount of data written to flash memory 116 by an application of applications 125 during a specified time period with the amount of data that the application may write to flash memory 116 as indicated by the application-specific disk access overuse threshold to determine whether the application is overusing disk access of flash memory 116.

OS 130 may therefore determine, based on comparing the respective disk access usage of flash memory 116 within a specified time period by each of applications 125 with a respective application-specific disk access overuse threshold, one or more applications that are overusing disk access of flash memory 116 within the specified time period. OS 130 may, in response, take one or more actions to limit the amount of further disk access by the one or more applications within the specified time period. For example, OS 130 may terminate an application that is overusing the disk access of flash memory 116 within the specified time period n to prevent further disk access usage by the application during the specified time period. In the example where the specified time period is one day (e.g., from 12:00 AM to 11:59 PM, OS 130 may terminate the application to prevent the application from executing until 12:00 AM of the next day.

In some examples, OS 130 may periodically determine the respective disk access usage of flash memory 116 by each of applications 125 at a relatively long interval, such as every ten seconds, every minute, and the like. Such a long interval between determining the respective disk access usage of each of applications 125 may cause OS 130 to react too slowly to overuse of disk access of flash memory 116 by one or more of applications 125. As such, in some examples, OS 130 may be configured to detect the occurrence of a system-wide disk access overuse condition. OS 130 may, in response to detecting the occurrence of the system-wide disk access overuse condition, determine the respective disk access usage of flash memory 116 by each of applications 125 and compare the respective disk access usage of flash memory 116 by each of applications 125 with a respective disk access usage threshold to determine one or more of applications 125 that are overusing disk access of flash memory 116.

A system-wide disk access overuse condition may correspond to a short burst in disk access usage of flash memory 116. To determine whether a system-wide disk access overuse condition has occurred, OS 130 may periodically poll a file in system memory, such as the /proc/diskstats file, that specifies the total amount of data written to flash memory 116 since bootup of head unit 102. OS 130 may perform such polling for the total amount of data written to flash memory 116 at relatively short intervals, such as every five seconds. In some examples, OS 130 may determine that a system-wide disk access overuse condition has occurred when the aggregate amount of data over the last one or more polling by OS 130 for the total amount of data written to flash memory 116 exceeds a threshold.

OS 130 may determine that a system-wide disk access overuse condition has occurred when the aggregate amount of data written to flash memory 116 over a specified time period exceeds a threshold. For example, OS 130 may determine that a system-wide disk access overuse condition has occurred when the aggregate amount of data written to flash memory 116 over the last 30 seconds exceeds 500 megabytes. OS 130 may therefore, in response to detecting the occurrence of the system-wide disk access overuse condition, determine the respective disk access usage of flash memory 116 by each of applications 125 within a specified period and compare the respective disk access usage of each of applications 125 within the specified period with a respective disk access usage threshold to determine one or more of applications 125 that are overusing disk access of flash memory 116 within the specified period. OS 130 may therefore terminate an application that is overusing the disk access of flash memory 116 within the specified period to prevent further overuse of disk access of flash memory 116 by the application.

Figure 2:
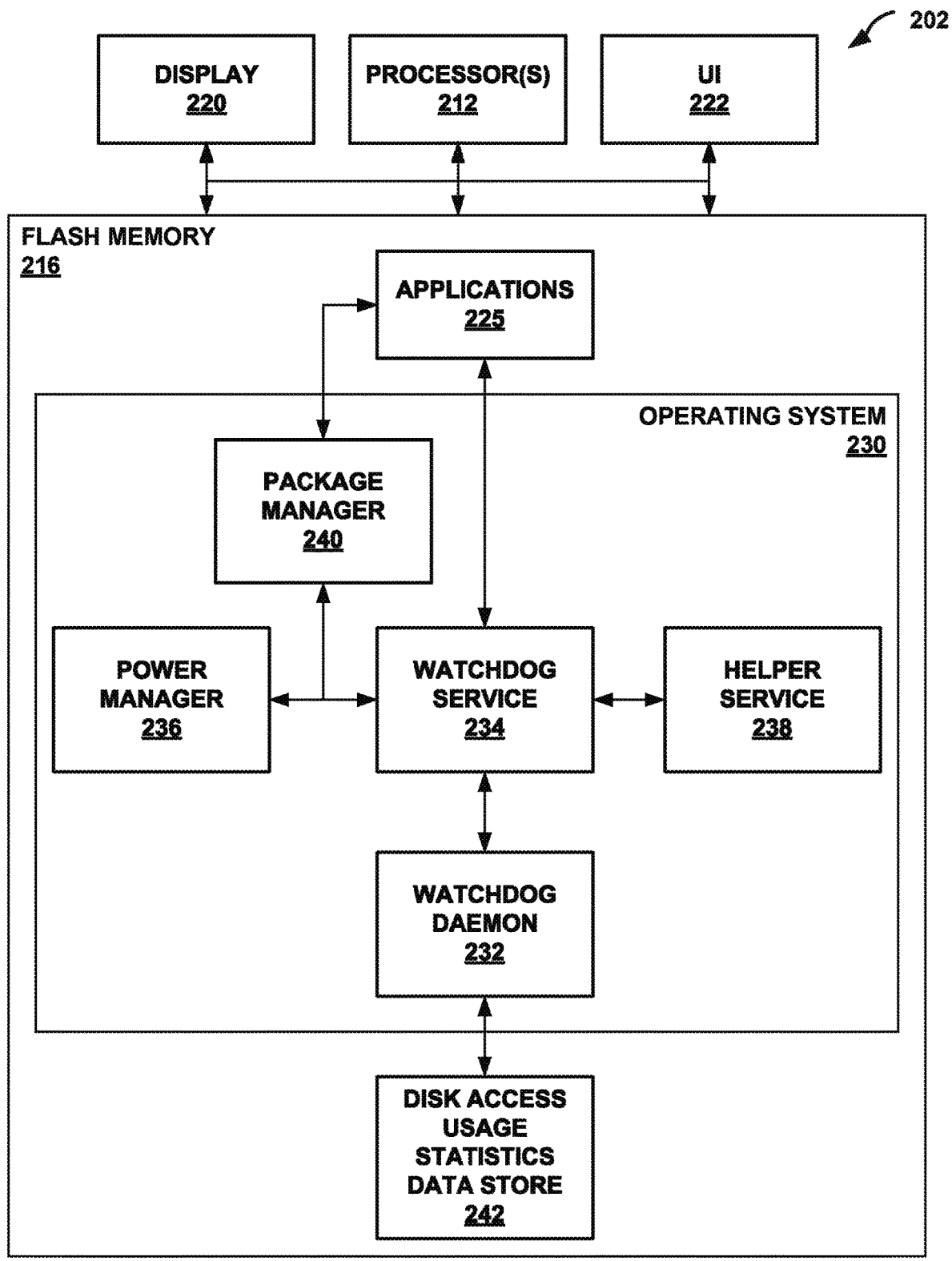
FIG. 2 is a block diagram illustrating examples of the example head unit of FIG. 1 in more detail.

FIG. 2 is a block diagram illustrating examples of the example head unit 102 of FIG. 1 in more detail. Head unit 202 shown in the example of FIG. 2 is one example of head unit 102 shown in FIG. 1. Head unit 202 may include one or more processors 212, flash memory 216, display 220 and UI 222. One or more processors 212 is an example of one or more processors 112 shown in FIG. 1. Flash memory 216 is an example of flash memory 116 of FIG. 1. Display 220 is an example of display 120 of FIG. 1. UI 222 is an example of UI 122 of FIG. 1.

Flash memory 216 may include OS 230, which is an example of OS 130 of FIG. 1. OS 230 includes watchdog daemon 232, watchdog service 234, power manager 236, helper service 238, and package manager 240 that executes at one or more processors 212 to perform various functionalities of OS 230. For example, watchdog daemon 232 may execute at one or more processors 212 to monitor the disk access usage statistics of head unit 202 by polling disk access usage statistics data store 242.

Disk access usage statistics data store 242 may store system-wide data access usage statistics of flash memory 216. For example, disk access usage statistics data store 242 may include a/proc/diskstats file that contains per block device statistics regarding the amount of data written to flash memory 216 since bootup of head unit 202.

Disk access usage statistics data store 242 may also store per-application disk access usage statistics of flash memory 216. For example, disk access usage statistics data store 242 may include a/proc/uid_io/stats file that includes per-user identifier (UID) disk I/O stats for all applications 225 that have executed at one or more processors 212, where each of application 225 is associated with a UID. Specifically, the/proc/uid_io/stats file may include, for each application of applications 225, per-UID disk I/O stats in the form of the number of bytes written by each application to flash memory 216. In this way, the/proc/uid_io/stats file may separately track the number of bytes written by each application of applications 225 to flash memory 216.

In some examples, watchdog daemon 232 executes at one or more processors 212 to periodically determine the respective disk access usage of flash memory 216 within a specified time period by each of applications 225. The specified time period may be a day, two days, a week, and the like. For example, watchdog daemon 232 may also execute at one or more processors 212 to periodically poll the/proc/uid_io/ stats file in disk access usage statistics data store 242 every M seconds, such as every 10 seconds, every 15 seconds, every minute, and the like, and reads the total number of bytes written to flash memory 216 by each of applications 225 since startup of head unit 202 to determine the respective disk access usage of flash memory 216 within the specified time period by each of applications 225.

Watchdog daemon 232 may track the per-application disk access usage of flash memory 216 within a specified time period, such as a day, 12 hours, 48 hours, and the like. While disk access usage statistics data store 242 stores the per-application disk access usage of flash memory 216 since bootup of head unit 202, the bootup of head unit 202 may not necessarily occur at the start of such a time period, and thus the per-application disk access usage of flash memory 216 since bootup of head unit 202 may not the same as the per-application disk access usage of flash memory 216 over the specified time period. For example, if the specified time period is a day, from 12:00 AM of the day to 11:59 PM of the day, the head unit 202 booting up at 5:00 PM may cause disk access usage statistics data store 242 to store the per-application disk access usage of flash memory 216 only since 5:00 PM of that day.

As such, watchdog daemon 232 may use the per-application disk access usage of flash memory 216 since bootup of head unit 202 as stored by disk access usage statistics data store 242 to determine the per-application disk access usage of flash memory 216 during the specified period. Because the UID of an application is not guaranteed to be the same across reboots of head unit 202, package manager 240 of OS 230 may execute at one or more processors 212 to determine associations between UIDs and package names of applications 225 and send indications of such associations to watchdog daemon 232. Watchdog daemon 232 may therefore track the UIDs of each of applications 225 across reboots during the specified time period to determine the disk access usage of each of applications 225 across reboots during the specified time period, and may store an association of each application of applications 225 with the amount of disk access usage of flash memory 216 by the application during the specified time period in disk access usage statistics data store 242. Similarly, watchdog daemon may track the amount system-wide disk access usage of flash memory 216 during the specified time period across reboots and store the amount system-wide disk access usage of flash memory 216 during the specified time period in disk access usage statistics data store 242.

In some examples, disk access usage statistics data store 242 may store, for each of applications 225, separate disk access usage statistics for the application for different application states and different operating modes of head unit 202. In some examples, an application may execute in a foreground state or a background state. An application may execute in a foreground state when the application is a foreground application, such that the GUI of the application is outputted for display at display 220. Conversely, an application may execute in a background state when the application is a background application, such that the GUI of the application is not outputted for display at display 220. The disk access usage of the application while in the foreground state and the disk access usage of the application while in the background state may therefore be tracked separately in disk access usage statistics data store 242.

Similarly, head unit 202 may operate in different operating modes, such as in a garage mode or in a normal mode. Head unit 202 may operate in a garage mode when the vehicle of head unit 202 is in an idle state. For example, the vehicle of head unit 202 may be in the idle state if the vehicle is not being used or operated by a user (e.g., an occupant) for a specified period of time (e.g., 30 minutes, one hour, etc.). In another example, the vehicle of head unit 202 is parked and the engine of the vehicle is turned off. Head unit 202 may otherwise operate in a normal mode when the vehicle is no longer in an idle state, such as when the vehicle is being used or operated by a user, or when the engine of the vehicle is turned on. The disk access usage of each of applications 225 while head unit 202 operates in a normal mode and the disk access usage of each of applications 225 while head unit 202 operates in a garage mode may therefore be tracked separately in disk access usage statistics data store 242.

In some examples, watchdog daemon 232 also executes at one or more processors 212 to periodically determine the system-wide disk access usage of flash memory 216 to determine the occurrence of a system-wide disk access overuse condition. For example, watchdog daemon 232 executes at one or more processors 212 to periodically poll the /proc/diskstats file in disk access usage statistics data store 242 every N seconds, such as every second, every 3 seconds, every 5 seconds, and the like, where N is smaller than M, and reads the total number of bytes written to flash memory 216 since startup of head unit 202. Watchdog daemon 232 may determine that a system-wide disk access overuse condition has occurred when the aggregate amount of data written to flash memory 216 over a specified amount of time exceeds a threshold. For example, watchdog daemon 232 may determine that a system-wide disk access overuse condition has occurred when the aggregate amount of data written to flash memory 216 over the last 30 seconds exceeds one gigabyte. Watchdog daemon 232 may, in response to determining the occurrence of a system-wide disk access overuse condition, determine the respective disk access usage of flash memory 216 within a specified time period by each of applications 225, such as according to the techniques described above.

Watchdog daemon 232 of OS 230 may execute at one or more processors 212 to utilize the disk access usage statistics stored in disk access usage statistics data store 242 to detect overuse of disk access of flash memory 216 by one or more applications and to remedy such overuse of disk access of flash memory 216 by the one or more applications. To that end, watchdog daemon 232 may, in response to determining the respective disk access usage of flash memory 216 by each of applications 225, or in response to determining the occurrence of a system-wide disk access overuse condition, compare the respective disk access usage of flash memory 216 by each of applications 225 with a respective application-specific disk access usage threshold to detect overuse of disk access of flash memory 216 by one or more applications of applications 225.

The disk access usage threshold associated with an application may indicate the total amount of data (e.g., in bytes) that can be written by the application to flash memory 216 during a specified time period (e.g., in a day). Therefore, to compare the disk access usage of an application with the disk access usage threshold associated with the application, watchdog daemon 232 may compare the disk access usage of an application during the specified period, such as stored in disk access usage statistics data store 242, with the disk access usage threshold associated with the application. If watchdog daemon 232 determines that the disk access usage of an application during the specified period exceeds (i.e., is greater than) the disk access usage threshold associated with the application, watchdog daemon 232 may determine an overuse of the disk access of flash memory 216 by the application.

In some examples, each of applications 225 may be associated with a plurality of application-specific disk access usage thresholds. In some examples, an application may be associated with a disk access usage threshold associated with each of a plurality of application states, such as a disk access usage threshold associated with a foreground state and a disk access usage threshold associated with a background state. In some examples, an application may be associated with a disk access usage threshold associated with each of one or more operating modes of head unit 202, such as a disk access usage threshold associated with a garage mode.

The plurality of disk access usage thresholds associated with an application may differ from each other. In some examples, the disk access usage threshold associated with a garage mode may be greater than the disk access usage threshold associated with a foreground state and the disk access usage threshold associated with a background state because head unit 202 may, when in the garage mode, download and/or perform system updates and application updates, and therefore write greater amounts of data to flash memory 216 than when head unit 202 is not in the garage mode. In some examples, the disk access usage threshold associated with a foreground state may be greater than the disk access usage threshold associated with a background state in order to avoid terminating foreground applications that are executing at one or more processors 212.

As such, to compare the disk access usage of flash memory 216 by an application with an application-specific disk access usage threshold associated with the application, watchdog daemon 232 may determine the operating mode of head unit 202 and/or the application state of the application. For example, watchdog daemon 232 may receive, from package manager 240, an indication of the application state of the application and/or may receive, from power manager 236, an indication of the operating mode of head unit 202.

Watchdog daemon 232 may determine, based on the application state of the application and/or the operating mode of head unit 202, an application-specific disk access usage threshold out of a plurality of application-specific disk access usage thresholds, and may compare the disk access usage of flash memory 216 by the application with the determined application-specific disk access usage threshold associated with the application. For example, if watchdog daemon 232 determines that an application is in a foreground state, watchdog daemon 232 may compare the disk access usage of flash memory 216 of the application while in the foreground state with the disk access usage threshold associated with a foreground state. In another example, if watchdog daemon 232 determines that it is in a garage mode, watchdog daemon 232 may compare the disk access usage of flash memory 216 of the application with the disk access usage threshold associated with the garage mode.

Watchdog daemon 232 may therefore compare a respective disk access usage of flash memory 216 by each of applications 225 within a specified time period with a respective application-specific disk access usage threshold to determine one or more of applications 225 that overuse the disk access of flash memory 216. Specifically, if watchdog daemon 232 determines that the disk access usage of flash memory 216 by an application within the specified time period exceeds the application-specific disk access usage threshold, watchdog daemon 232 may determine that the application is overusing disk access of flash memory 216.

In some examples, watchdog daemon 232 may also determine, based on comparing the respective disk access usage of flash memory 216 by each of applications 225 within the specified time period with the respective application-specific disk access usage threshold, one or more of applications 224 that are not overusing the disk access of flash memory 216 but are potentially in danger of overusing the disk access of flash memory 216 before the end of the specified time period. For example, if watchdog daemon 232 determines that the disk access usage of flash memory 216 by an application within the specified time period does not exceed the application-specific disk access usage threshold but instead exceeds a specified percentage of the application-specific disk access usage threshold, such as by exceeding 70% of the application-specific disk access usage threshold, watchdog daemon 232 may determine that the application is potentially in danger of overusing the disk access of flash memory 216 before the end of the specified time period.

Watchdog daemon 232 may, for each of one or more of applications 225 that are not overusing the disk access of flash memory 216, determine the remaining amount of disk access usage of flash memory 216 by the application before the application would be overusing disk access of flash memory 216. Specifically, watchdog daemon 232 may determine, for an application, the remaining amount of disk access usage of flash memory 216 by the application before the application is overusing disk access of flash memory 216 as the difference between the application-specific disk access usage threshold associated with the application and the disk access usage of flash memory 216 by an application within the specified time period.

Watchdog daemon 232 may communicate with watchdog service 234 that executes at one or more processors 212 to push the data collected by watchdog daemon 232 to watchdog service 234. For example, on each periodic polling watchdog daemon 232 pushes the latest per-application statistics (e.g., remaining bytes, total written bytes, total number of overuses for the specified time period, etc.) along with the list of potential overuses and actual overuses to watchdog service 234.

In some examples, watchdog daemon 232 and/or watchdog service 234 may send, to each application that is determined to potentially be in danger of overusing the disk access of flash memory 216 before the end of the specified time period, a notification that indicates the application is potentially in danger of overusing the disk access of flash memory 216 before the end of the specified time period. In some examples, watchdog daemon 232 may send notifications to native services while watchdog service 234 may send notifications to Java applications and services. Watchdog daemon 232 and/or watchdog service 234 may include, in the notification sent to each application, the remaining amount of disk access usage of flash memory 216 by the application before the application is overusing disk access of flash memory 216. An application may, in response to receiving the notification, take one or more actions to reduce the disk access usage of flash memory 216 during the specified time period, such as by reducing the number of bytes that the application writes to flash memory 216.

In some examples, an application may, at any time, also query watchdog daemon 232 and/or watchdog service 234 regarding the remaining amount of disk access usage of flash memory 216 by the application before the application is overusing disk access of flash memory 216. Watchdog daemon 232 and/or watchdog service 234 may, in response to receiving such a query from an application, determine the remaining amount of disk access usage of flash memory 216 by the application before the application is overusing disk access of flash memory 216 and may send, to the application, an indication of the remaining amount of disk access usage of flash memory 216 by the application before the application is overusing disk access of flash memory 216.

Watchdog service 234 may, for each of one or more of applications 225 that watchdog service 234 has determined to be overusing disk access of flash memory 216, determine whether the application is able to be terminated by head unit 202. In some examples, applications 225 may include first-party applications, which are applications that are developed or controlled by original equipment manufacturers (OEMs) of head unit 202 and applications developed or controlled by the same organization that developed or controlled OS 230, and third-party applications, which are not developed or controlled by OEMs of head unit 202 or the organization that developed or controlled OS 230. In some examples, while head unit 202 is able to terminate third-party applications, head unit 202 may only be able to terminate first-party applications that are explicitly included in a safe-to-terminate list. This may be because certain first-party applications may be critical system components that head unit 202 may depend on for proper functioning of head unit 202. As such, watchdog service 234 may determine that head unit 202 is able to terminate an application if the application is a third-party application or if the application is a first-party application explicitly included in a safe-to-terminate list.

Watchdog service 234 may send, to each application of applications 225 that watchdog service 234 has determined to be overusing disk access of flash memory 216 and that head unit 202 is not able to terminate, a notification that indicates the application is overusing disk access of flash memory 216. The application may, in response to receiving the notification, take one or more actions to reduce the disk access usage of flash memory 216 during the specified time period, such as by reducing the number of bytes that the application writes to flash memory 216.

Watchdog service 234 may determine, for each application of applications 225 that watchdog service 234 has determined to be overusing disk access of flash memory 216 and that head unit 202 is able to terminate, whether to terminate the application. Terminating an application may include ceasing execution of the application by one or more processors 212. Once an application has been terminated, head unit 202 may refrain from executing the application at one or more processors 212 until the user provides input at UI 222 that corresponds to a command to restart execution of the application at one or more processors 212. To terminate an application, watchdog service 234 may send an indication of the application to be terminated to helper service 238 of OS 230 that executes at one or more processors 212. Helper service 238 may, in response to receiving the indication of the application to be terminated from watchdog service 234, terminate the indicated application.

In some examples, to determine whether to terminate an application that watchdog service 234 has determined to be overusing disk access of flash memory 216 and that head unit 202 is able to terminate, watchdog service 234 may determine whether the overuse of the disk access of flash memory 216 by the application is a recurrent overuse of the disk access of flash memory 216 by the application. Each time watchdog service 234 detects overuse of the disk access of flash memory 216 by an application, watchdog service 234 may store an indication of such an overuse of the disk access of flash memory 216 by the application, such as in disk access usage statistics data store 242, thereby keeping track of the number of times the application has overused the disk access of flash memory 216 over time.

Thus, if watchdog service 234 determines that the number of occurrences of overuse of the disk access of flash memory 216 by the application occurs more than a specified number of times within a specified number of days, watchdog service 234 may determine that the overuse of the disk access of flash memory 216 by the application is a recurrent overuse of the disk access of flash memory 216 by the application. For example, watchdog service 234 may determine that the overuse of the disk access of flash memory 216 by the application is a recurrent overuse of the disk access of flash memory 216 by the application if the overuse of disk access of flash memory 216 by the application occurs more than six times within thirty days. Watchdog service 234 may, in response to determining that the overuse of the disk access of flash memory 216 by the application is a recurrent overuse of the disk access of flash memory 216 by the application, terminate the application.

In some examples, watchdog service 234 may terminate an application that watchdog service 234 has determined to be overusing disk access of flash memory 216 and that head unit 202 is able to terminate if display 220 is turned off. Thus, watchdog service 234 may, in response to determining that an application is overusing disk access of flash memory 216 and that head unit 202 is able to terminate the application, determine whether display 220 is turned on. If watchdog service 234 determines that display 220 is not turned on, watchdog service 234 may, in response, terminate the application. In some examples, watchdog service 234 may, in response to determining that the overuse of the disk access of flash memory 216 by the application is not a recurrent overuse of the disk access of flash memory 216 by the application, determine whether display 220 is turned on. If watchdog service 234 determines that display 220 is not turned on, watchdog service 234 may, in response, terminate the application.

In some examples, watchdog service 234 may, when display 220 is turned on, terminate an application that watchdog service 234 has determined to be overusing disk access of flash memory 216 and that head unit 202 is able to terminate if the application is not a foreground application. Watchdog service 234 may receive, from package manager 240, an indication of the application state of an application to determine whether the application is a foreground application or a background application. Watchdog service 234 may, in response to determining that the application is a background application, terminate the application.

In some examples, if watchdog service 234 is unable to terminate an application that is overusing disk access of flash memory 216, such as if display 220 is turned on and the application is a foreground application, watchdog service 234 may notify the user of head unit 202 that the application is overusing disk access of flash memory 216 to enable the user to choose whether to terminate the application. For example, watchdog service 234 may, in response to determining that it is unable to terminate an application that is overusing disk access of flash memory 216, output, for display at display 220, a notification that indicates the application is overusing disk access of flash memory 216. If the user, in response to the notification being displayed at display 220, provides user input at UI 222 that corresponds to a request to terminate the application, watchdog service 234 may terminate the application.

Figure 3A:
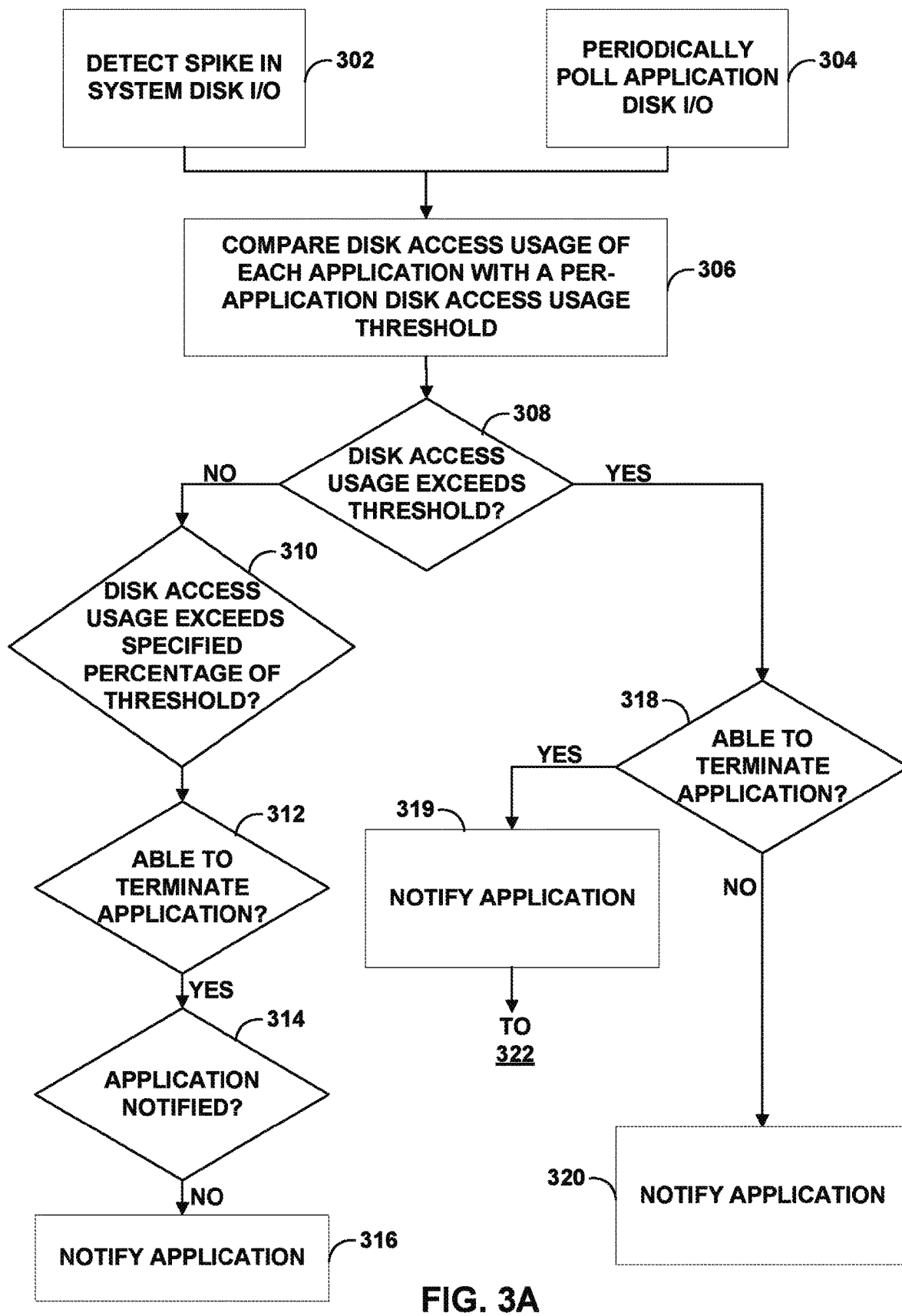
FIGS. 3A and 3B are a flowchart illustrating an example operation that can be performed by the example head unit of FIG. 2 to manage the disk access usage of applications.
Figure 3B:
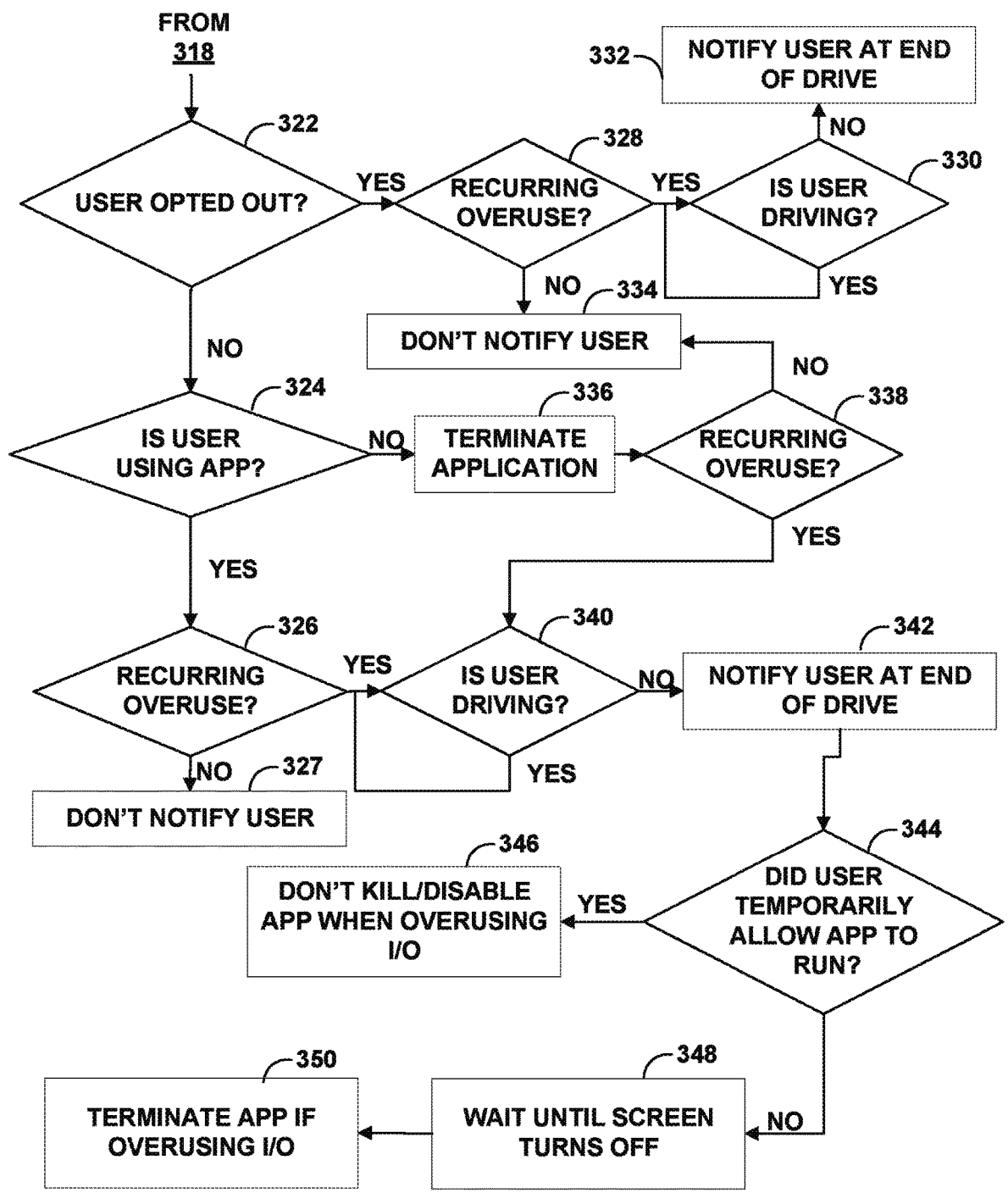

FIGS. 3A and 3B are a flowchart illustrating an example operation that can be performed by example head unit 202 of FIG. 2 to manage the disk access usage of applications. The techniques of FIGS. 3A and 3B are described in context of head unit 202 of FIG. 2.

As shown in FIG. 3A, OS 230 may detect the occurrence of a system-wide disk access overuse condition may, in response, determine per-application disk access usage statistics of each of applications 225 at head unit 202 (302). In some examples, instead of or in addition to detecting the occurrence of a system-wide disk access overuse condition, OS 230 may periodically determine the disk access usage statistics of each of applications 225 (304). The per-application disk access usage statistics of each of applications 225 may be, for each application of applications 225, the amount of data written by the application to flash memory 216 within a specified period of time, such as within a day.

OS 230 may, in response to determining the disk access usage statistics of each of applications 225, compare the amount of disk access usage of each application with an application-specific disk access usage threshold (306). Each application of applications 225 may be associated with a disk access usage threshold that is specific to the application. As such, different applications of applications 225 may have different disk access usage thresholds.

In some examples, an application may operate in different application states, and the application-specific disk access usage threshold associated with an application may include application state-specific disk access usage thresholds that may change depending on the application state of the application. For example, an application may operate in a foreground state or in a background state. An application operates in a foreground state when the graphical user interface of the application is being outputted at the display of head unit 202. Conversely, an application operates in a background state when the graphical user interface of the application is not being outputted at the display of head unit 202.

Thus, an application may be associated with both a foreground disk access usage threshold and a background disk access usage threshold. In some examples, the foreground disk access usage threshold associated with an application may be different from the background disk access usage threshold associated with the application. For example, the foreground disk access usage threshold associated with an application may be greater than the background disk access usage threshold associated with the application.

When the application operates in a foreground state, OS 230 may compare the disk access usage of the application with the foreground disk access threshold associated with the application to determine whether the disk access usage of the application exceeds the foreground disk access threshold. Conversely, when the application operates in a background state, OS 230 may compare the disk access usage of the application with the background disk access threshold associated with the application to determine whether the disk access usage of the application exceeds the background disk access threshold.

In some examples, head unit 202 may operate in different system modes, and the application-specific disk access usage threshold associated with an application may change depending on the system mode of head unit 202. For example, head unit 202 may operate in either a normal mode or a garage mode. Head unit 202 may operate in a garage mode when the vehicle of head unit 202 is parked and the engine of the vehicle is turned off, and head unit 202 may operate in a normal mode when the engine of the vehicle is not turned off.

Thus, an application may be associated with a garage mode disk access usage threshold, which may be different from the foreground disk access threshold associated with the application and the background disk access threshold associated with the application. For example, when head unit 202 operates in the garage mode, head unit 202 may download and install updates to applications 225 and/or OS 230, and thus may perform read and writes to flash memory 216 at a higher rate than when an application is in a foreground state or a background state. As such, the garage mode disk access usage threshold associated with an application may be higher than the foreground disk access threshold associated with the application and the background disk access threshold associated with the application.

To compare the disk access usage of an application with an application-specific disk access usage threshold, OS 230 may determine a plurality of disk access usage thresholds associated with the application, such as the background disk access usage threshold associated with the application, the foreground disk access usage threshold associated with the application, the garage mode disk access usage threshold associated with the application, and the normal mode disk access usage threshold associated with the application. OS 230 may determine the current application state of the application and/or the current operating mode of head unit 202. OS 230 may, based on the current application state of the application and/or the current operating mode of head unit 202, determine the disk access usage threshold associated with the application out of the plurality of disk access usage thresholds associated with the application. OS 230 may therefore compare the disk access usage of the application with the disk access usage threshold associated with the application.

OS 230 may compare the disk access usage of each of applications 225 with the respective application-specific disk access usage threshold to determine whether the disk access usage of each of applications 225 exceeds the disk access usage threshold associated with the application (308). If OS 230 determines that the disk access usage of an application does not exceed the disk access usage threshold associated with the application, OS 230 may determine whether the disk access usage of the application exceeds a specified percentage, such as 70%, the disk access usage threshold associated with the application (310).

If OS 230 determines that the disk access usage of the application exceeds a specified percentage of the disk access usage threshold associated with the application, OS 230 may warn the application that the application may be terminated if the disk access usage of the application exceeds the disk access usage threshold associated with the application. Specifically, OS 230 may determine whether the application can be terminated due to excess disk access usage (312). If the application cannot be terminated due to excess disk access usage, then it may not be necessary to warn the application that the application may be terminated if the disk access usage of the application exceeds the disk access usage threshold associated with the application.

In some examples, all third-party applications can be terminated due to excess disk access usage, but first-party applications and system application cannot be terminated due to excess disk access usage unless these applications are on a safe-to-terminate list. Thus, to determine whether an application can be terminated due to excess disk access usage, OS 230 may determine whether the application is a third-party application or is an application on the safe-to-terminate list.

If OS 230 determines that the application can be terminated due to excess disk access usage, OS 230 may determine whether OS 230 has previously sent a notification to the application to warn the application that the application may be terminated if the disk access usage of the application exceeds the disk access usage threshold associated with the application (314). If OS 230 determines that OS 230 has not previously sent a notification to the application to warn the application that the application may be terminated if the disk access usage of the application exceeds the disk access usage threshold associated with the application, OS 230 may send a notification to the application to the application to warn the application that the application may be terminated if the disk access usage of the application exceeds the disk access usage threshold associated with the application (316).

In some examples, the notification may indicate the remaining amount of data that can be safely written by the application to flash memory 216. The remaining amount of data that can be safely written by the application to flash memory 216 may be the difference between the disk access usage threshold associated with the application and the current disk access usage of the application.

If OS 230 determines that the disk access usage of the application exceeds the disk access usage threshold associated with the application, OS 230 may determine whether the application can be terminated due to excess disk access usage (318). As described above, in some examples, all third-party applications can be terminated due to excess disk access usage, but first-party applications and system application cannot be terminated due to excess disk access usage unless these applications are on a safe-to-terminate list. If OS 230 determines that the application cannot be terminated due to excess disk access usage, OS 230 may send a notification to the application that indicates the disk access usage of the application is excessive (320). The application may, in response to receiving the notification, reduce its disk access usage.

If OS 230 determines that the disk access usage of the application exceeds the disk access usage threshold associated with the application and that the application can be terminated due to excess disk access usage, OS 230 may send a notification to the application that indicates the disk access usage of the application is excessive (329) and may terminate the application under certain conditions. As shown in FIG. 3B, if OS 230 determines that the disk access usage of the application exceeds the disk access usage threshold associated with the application and that the application can be terminated due to excess disk access usage, OS 230 may determine whether the user has opted out of terminating applications due to excess disk access usage (322). If OS 230 determines that the user has not opted out of terminating applications due to excess disk access usage (NO at 322). OS 230 may determine whether the user is currently using the application (324). For example, OS 230 may determine that the user is currently using the application if display 220 is turned on and the application is the foreground application (i.e., the application is in a foreground state).

OS 230 may, in response to determining that the user is not currently using the application (NO at 324), terminate the application (336) and may determine whether the overuse of disk access by the application is a reoccurring overuse of disk access by the application (338). The overuse of disk access by an application may be a reoccurring overuse of disk access by the application if the overuse of disk access by the application occurs more than a specified number of times within a specified number of days. For example, overuse of disk access by an application may be a reoccurring overuse of disk access by the application if the overuse of disk access by the application occurs more than six times within thirty days.

If OS 230 determines that the overuse is not a reoccurring overuse (NO at 338), OS 230 may not notify the user of the disk access usage of the application exceeding the disk access usage threshold associated with the application (334). If OS 230 determines that the overuse is a reoccurring overuse (YES at 338), OS 230 may determine whether the user is currently driving the vehicle (340). If the user is currently driving the vehicle (YES at 340), OS 230 may wait until the user is no longer driving the vehicle. When the user is no longer driving the vehicle (NO at 340), OS 230 may notify the user of head unit 202 that the application is overusing disk access of flash memory 216 (342). For example, one or more processors 212 may output, for display at display 220, a notification that includes an indication that the current foreground application is overusing disk access of flash memory 216 and that allows the user to provide input at UI 222 to indicate whether to temporarily allow the application to execute (344).

If the user chooses to temporarily allow the application to run, such as by providing user input at UI 222 (YES at 344), OS 230 may refrain from terminating the application when the application is overusing disk access of flash memory 216 (346). If the user does not choose to temporarily allow the application to run (NO at 344), such as by providing user input at UI 222, OS 230 may wait until the display 220 to turn off (348) and terminate the application (350).

OS 230 may, in response to determining that the user is currently using the application (YES at 324), determine whether the overuse of disk access by the application is a reoccurring overuse of disk access by the application (326). The overuse of disk access by an application may be a reoccurring overuse of disk access by the application if the overuse of disk access by the application occurs more than a specified number of times within a specified number of days. For example, overuse of disk access by an application may be a reoccurring overuse of disk access by the application if the overuse of disk access by the application occurs more than six times within thirty days.

If OS 230 determines that the overuse is not a reoccurring overuse (NO at 326), OS 230 may not notify the user of the disk access usage of the application exceeding the disk access usage threshold associated with the application (327). If OS 230 determines that the overuse is a reoccurring overuse (YES at 326), OS 230 may determine whether the user is currently driving the vehicle (340). If the user is currently driving the vehicle (YES at 340), OS 230 may wait until the user is no longer driving the vehicle. When the user is no longer driving the vehicle (NO at 340), OS 230 may notify the user of head unit 202 that the application is overusing disk access of flash memory 216 (342). For example, one or more processors 212 may output, for display at display 220, a notification that includes an indication that the current foreground application is overusing disk access of flash memory 216 and that allows the user to provide input at UI 222 to indicate whether to temporarily allow the application to execute.

If the user chooses to temporarily allow the application to run (YES at 344), such as by providing user input at UI 222, OS 230 may refrain from terminating the application when the application is overusing disk access of flash memory 216 (346). If the user does not choose to temporarily allow the application to run (NO at 344), such as by providing user input at UI 222, OS 230 may wait until the display 220 to turn off (348) and terminate the application (350).

If OS 230 determines that the user has opted out of terminating applications due to excess disk access usage (YES at 322), OS 230 may determine whether determine whether the overuse of disk access by the application is a reoccurring overuse of disk access by the application (328). The overuse of disk access by an application may be a reoccurring overuse of disk access by the application if the overuse of disk access by the application occurs more than a specified number of times within a specified number of days. For example, overuse of disk access by an application may be a reoccurring overuse of disk access by the application if the overuse of disk access by the application occurs more than six times within thirty days.

If OS 230 determines that the overuse of disk access by the application is not a recurring overuse of disk access by the application (NO at 328), OS 230 may not notify the user of the disk access usage of the application exceeding the disk access usage threshold associated with the application (334). If OS 230 determines that the overuse of disk access by the application is a recurring overuse of disk access by the application (YES at 328), OS 230 may determine whether the user is currently driving the vehicle (330). If the user is currently driving the vehicle (YES at 330), OS 230 may wait until the user is no longer driving the vehicle. When the user is no longer driving the vehicle (NO at 330), OS 230 may notify the user of head unit 202 that the application is overusing disk access of flash memory 216 (332). For example, one or more processors 212 may output, for display at display 220, a notification that includes an indication that the current foreground application is overusing disk access of flash memory 216.

Figure 4:
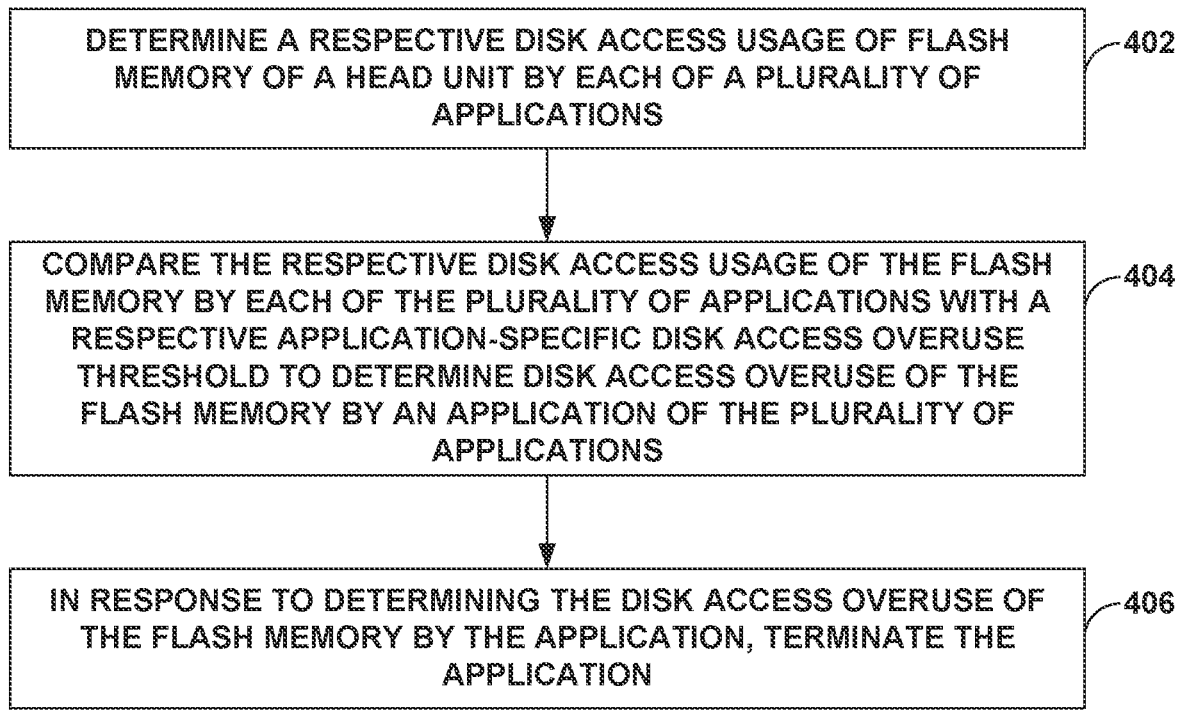
FIG. 4 is a flowchart illustrating an example operation that can be performed by the example head unit 202 of FIG. 2 to manage the disk access usage of applications.

FIG. 4 is a flowchart illustrating example operation of example head unit 202 of FIG. 2 in to manage the disk access usage of applications. FIG. 4 is described with respect to FIG. 2.

As shown in FIG. 4, one or more processors 212 of head unit 202 may determine a respective disk access usage of a flash memory 216 of head unit 202 by each of a plurality of applications 225 (402). One or more processors 212 may compare the respective disk access usage of the flash memory by each of the plurality of applications 225 with a respective application-specific disk access overuse threshold to determine disk access overuse of the flash memory 216 by an application of the plurality of applications 225 (404). One or more processors 212 may, in response to determining the disk access overuse of the flash memory 216 by the application, terminate the application (406).

In some examples, to compare the respective disk access usage of the flash memory by each of the plurality of applications 225 with the respective application-specific disk access overuse threshold to determine the disk access overuse of the flash memory 216 by the application, the one or more processors 212 may compare a disk access usage of the flash memory 216 by the application with a disk access overuse threshold associated with the application. The one or more processors 212 may, in response to determining that the disk access usage of the flash memory 216 by the application exceeds the disk access overuse threshold associated with the application, determine the disk access overuse of the flash memory 216 by the application.

In some examples, the one or more processors 212 may determine an application state of the application and determine, based at least in part on the application state of the application, the disk access overuse threshold associated with the application from a plurality of disk access overuse thresholds associated with the application.

In some examples, the one or more processors 212 may determine an operating mode of the head unit 202. The one or more processors 212 may determine, based at least in part on the operating mode of the head unit 202, the disk access overuse threshold associated with the application from a plurality of disk access overuse thresholds associated with the application.

In some examples, the respective application-specific disk access overuse threshold of each of the plurality of applications 225 is associated with a specified time period, and the respective disk access usage of the flash memory 216 by each of the plurality of applications 225 is the respective disk access usage of the flash memory 216 within the specified time period by each of the plurality of applications 225.

In some examples, to determine the respective disk access usage of the flash memory 216 of the head unit 202 by each of the plurality of applications 225, the one or more processors 212 may determine an occurrence of a system-wide disk access overuse condition. The one or more processors 212 may, in response to determining the occurrence of the system-wide disk access overuse condition, determine the respective disk access usage of the flash memory 216 of the head unit 202 by each of the plurality of applications 225.

In some examples, to determine the occurrence of the system-wide disk access overuse condition, the one or more processors 212 may determine that an aggregate amount of disk usage of the flash memory 216 exceeds a specified threshold over a specified amount of time. The one or more processors 212 may, in response to determining that the aggregate amount of disk usage of the flash memory 216 exceeds the specified threshold over the specified amount of time, determine the occurrence of the system-wide disk access overuse condition.

In some examples, to terminate the application, the one or more processors 212 may, in response to determining the disk access overuse of the flash memory 216 by the application, determine that a display 220 of the head unit 202 is turned off. The one or more processors 212 may, in response to determining that the display 220 of the head unit 202 is turned off, terminate the application.

In some examples, to terminate the application, the one or more processors 212 may, in response to determining that the disk access overuse of the flash memory 216 by the application, determine that a display 220 of the head unit 202 is not turned off. The one or more processors 212 may, in response to determining that the display 220 of the head unit 202 is not turned off, determine that the application is not a foreground application. The one or more processors 212 may, in response to determining that the application is not the foreground application, terminate the application.

Example 1: A method includes determining, by one or more processors of a computing device, a respective disk access usage of flash memory of the computing device by each of a plurality of applications; comparing, by the one or more processors, the respective disk access usage of the flash memory by each of the plurality of applications with a respective application-specific disk access overuse threshold to determine disk access overuse of the flash memory by an application of the plurality of applications; and in response to determining the disk access overuse of the flash memory by the application, terminating, by the one or more processors, the application.

Example 2: The method of example 1, wherein comparing the respective disk access usage of the flash memory by each of the plurality of applications with the respective application-specific disk access overuse threshold to determine the disk access overuse of the flash memory by the application further comprises: comparing, by the one or more processors, a disk access usage of the flash memory by the application with a disk access overuse threshold associated with the application; and in response to determining that the disk access usage of the flash memory by the application exceeds the disk access overuse threshold associated with the application, determining, by the one or more processors, the disk access overuse of the flash memory by the application.

Example 3: The method of example 2, further includes determining, by the one or more processors, an application state of the application; determining, by the one or more processors and based at least in part on the application state of the application, the disk access overuse threshold associated with the application from a plurality of disk access overuse thresholds associated with the application.

Example 4: The method of example 2, further includes determining, by the one or more processors, an operating mode of the computing device; determining, by the one or more processors and based at least in part on the operating mode of the computing device, the disk access overuse threshold associated with the application from a plurality of disk access overuse thresholds associated with the application.

Example 5: The method of any of examples 1-4, wherein: the respective application-specific disk access overuse threshold of each of the plurality of applications is associated with a specified time period; and the respective disk access usage of the flash memory by each of the plurality of applications is the respective disk access usage of the flash memory within the specified time period by each of the plurality of applications.

Example 6: The method of any of examples 1-5, wherein determining the respective disk access usage of the flash memory of the computing device by each of the plurality of applications further comprises: determining, by the one or more processors, an occurrence of a system-wide disk access overuse condition; and in response to determining the occurrence of the system-wide disk access overuse condition, determining, by the one or more processors, the respective disk access usage of the flash memory of the computing device by each of the plurality of applications.

Example 7: The method of example 6, wherein determining the occurrence of the system-wide disk access overuse condition further comprises: determining, by the one or more processors, that an aggregate amount of disk usage of the flash memory exceeds a specified threshold over a specified amount of time; and in response to determining that the aggregate amount of disk usage of the flash memory exceeds the specified threshold over the specified amount of time, determining, by the one or more processors, the occurrence of the system-wide disk access overuse condition.

Example 8: The method of any of examples 1-7, wherein terminating the application further comprises: in response to determining that the disk access overuse of the flash memory by the application, determining, by the one or more processors, that a display of the computing device is turned off; and in response to determining that the display of the computing device is turned off, terminating, by the one or more processors, the application.

Example 9: The method of any of examples 1-8, wherein terminating the application further comprises: in response to determining that the disk access overuse of the flash memory by the application, determining, by the one or more processors, that a display of the computing device is not turned off; in response to determining that the display of the computing device is not turned off, determining, by the one or more processors, that the application is not a foreground application; and in response to determining that the application is not the foreground application, terminating, by the one or more processors, the application.

Example 10: The method of any of examples 1-9, wherein the computing device comprises a head unit of a vehicle.

Example 11: A computing device includes flash memory; and one or more processors communicably coupled to the flash memory and configured to: determine a respective disk access usage of the flash memory by each of a plurality of applications; compare the respective disk access usage of the flash memory by each of the plurality of applications with a respective application-specific disk access overuse threshold to determine disk access overuse of the flash memory by an application of the plurality of applications; and in response to determining the disk access overuse of the flash memory by the application, terminate the application.

Example 12: The computing device of example 11, wherein to compare the respective disk access usage of the flash memory by each of the plurality of applications with the respective application-specific disk access overuse threshold to determine the disk access overuse of the flash memory by the application, the one or more processors are further configured to: compare a disk access usage of the flash memory by the application with a disk access overuse threshold associated with the application; and in response to determining that the disk access usage of the flash memory by the application exceeds the disk access overuse threshold associated with the application, determine the disk access overuse of the flash memory by the application.

Example 13: The computing device of example 12, wherein the one or more processors are further configured to: determine an application state of the application; determine, based at least in part on the application state of the application, the disk access overuse threshold associated with the application from a plurality of disk access overuse thresholds associated with the application.

Example 14: The computing device of example 12, wherein the one or more processors are further configured to: determine an operating mode of the computing device; determine, based at least in part on the operating mode of the computing device, the disk access overuse threshold associated with the application from a plurality of disk access overuse thresholds associated with the application.

Example 1415 The computing device of any of examples 11-14, wherein: the respective application-specific disk access overuse threshold of each of the plurality of applications is associated with a specified time period; and the respective disk access usage of the flash memory by each of the plurality of applications is the respective disk access usage of the flash memory within the specified time period by each of the plurality of applications.

Example 16: The computing device of any of examples 11-15, wherein to determine the respective disk access usage of the flash memory of the computing device by each of the plurality of applications, the one or more processors are further configured to: determine an occurrence of a system-wide disk access overuse condition, and in response to determining the occurrence of the system-wide disk access overuse condition, determine the respective disk access usage of the flash memory of the computing device by each of the plurality of applications.

Example 17: The computing device of example 16, wherein to determine the occurrence of the system-wide disk access overuse condition, the one or more processors are further configured to: determine that an aggregate amount of disk usage of the flash memory exceeds a specified threshold over a specified amount of time; and in response to determining that the aggregate amount of disk usage of the flash memory exceeds the specified threshold over the specified amount of time, determine the occurrence of the system-wide disk access overuse condition.

Example 18: The computing device of any of examples 11-17, wherein to terminate the application, the one or more processors are further configured to: in response to determining that the disk access overuse of the flash memory by the application, determine that a display of the computing device is turned off; and in response to determining that the display of the computing device is turned off, terminate the application.

Example 19: The computing device of any of examples 11-18, wherein to terminate the application, the one or more processors are further configured to: in response to determining that the disk access overuse of the flash memory by the application, determine that a display of the computing device is not turned off; in response to determining that the display of the computing device is not turned off, determine that the application is not a foreground application; and in response to determining that the application is not the foreground application, terminate the application.

Example 20: A non-transitory computer-readable storage medium having stored thereon instructions that, when executed, cause one or more processors of a computing device to: determine a respective disk access usage of flash memory of the computing device by each of a plurality of applications; compare the respective disk access usage of the flash memory by each of the plurality of applications with a respective application-specific disk access overuse threshold to determine disk access overuse of the flash memory by an application of the plurality of applications; and in response to determining the disk access overuse of the flash memory by the application, terminate the application.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as Bluetooth, WiFi, infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:
1. A method comprising:
   determining, by one or more processors of a computing device, a respective disk access usage of flash memory of the computing device by each of a plurality of applications based at least in part on periodically polling disk input/output statistics associated with the flash memory, wherein the respective disk access usage of the flash memory of the computing device corresponds to an amount of writes by a corresponding application to the flash memory of the computing device, and wherein the disk input/output statistics are stored in the flash memory;
   comparing, by the one or more processors, the respective disk access usage of the flash memory by each of the plurality of applications with a respective application-specific disk access overuse threshold to determine disk access overuse of the flash memory by an application of the plurality of applications; and
   in response to determining the disk access overuse of the flash memory by the application, terminating, by the one or more processors, the application for a specified time associated with a disk access overuse threshold associated with the application.

2. The method of claim 1, wherein comparing the respective disk access usage of the flash memory by each of the plurality of applications with the respective application-specific disk access overuse threshold to determine the disk access overuse of the flash memory by the application further comprises:

comparing, by the one or more processors, a disk access usage of the flash memory by the application with the disk access overuse threshold associated with the application; and in response to determining that the disk access usage of the flash memory by the application exceeds the disk access overuse threshold associated with the application, determining, by the one or more processors, the disk access overuse of the flash memory by the application.

3. The method of claim 2, further comprising:
determining, by the one or more processors, an application state of the application; and
determining, by the one or more processors and based at least in part on the application state of the application, the disk access overuse threshold associated with the application from a plurality of disk access overuse thresholds associated with the application.

4. The method of claim 2, further comprising:
determining, by the one or more processors, an operating mode of the computing device; and
determining, by the one or more processors and based at least in part on the operating mode of the computing device, the disk access overuse threshold associated with the application from a plurality of disk access overuse thresholds associated with the application.

5. The method of claim 1, wherein:
the respective application-specific disk access overuse threshold of each of the plurality of applications is associated with a specified time period; and
the respective disk access usage of the flash memory by each of the plurality of applications is the respective disk access usage of the flash memory within the specified time period by each of the plurality of applications.

6. The method of claim 1, wherein determining the respective disk access usage of the flash memory of the computing device by each of the plurality of applications further comprises:
determining, by the one or more processors, an occurrence of a system-wide disk access overuse condition; and
in response to determining the occurrence of the system-wide disk access overuse condition, determining, by the one or more processors, the respective disk access usage of the flash memory of the computing device by each of the plurality of applications.

7. The method of claim 6, wherein determining the occurrence of the system-wide disk access overuse condition further comprises:
determining, by the one or more processors, that an aggregate amount of disk usage of the flash memory exceeds a specified threshold over a specified time period; and
in response to determining that the aggregate amount of disk usage of the flash memory exceeds the specified threshold over the specified time period, determining, by the one or more processors, the occurrence of the system-wide disk access overuse condition.

8. The method of claim 1, wherein terminating the application further comprises:
in response to determining the disk access overuse of the flash memory by the application, determining, by the one or more processors, that a display of the computing device is turned off; and in response to determining that the display of the computing device is turned off, terminating, by the one or more processors, the application.

9. The method of claim 1, wherein terminating the application further comprises:
in response to determining that the disk access overuse of the flash memory by the application, determining, by the one or more processors, that a display of the computing device is not turned off;
in response to determining that the display of the computing device is not turned off, determining, by the one or more processors, that the application is not a foreground application; and
in response to determining that the application is not the foreground application, terminating, by the one or more processors, the application.

10. The method of claim 1, wherein the computing device comprises a head unit of a vehicle.

11. A computing device comprising:
flash memory; and
one or more processors communicably coupled to the flash memory and configured to:
determine a respective disk access usage of the flash memory by each of a plurality of applications based at least in part on periodically polling disk input/output statistics associated with the flash memory, wherein the respective disk access usage of the flash memory of the computing device corresponds to an amount of writes by a corresponding application to the flash memory of the computing device, and wherein the disk input/output statistics are stored in the flash memory;
compare the respective disk access usage of the flash memory by each of the plurality of applications with a respective application-specific disk access overuse threshold to determine disk access overuse of the flash memory by an application of the plurality of applications; and
in response to determining the disk access overuse of the flash memory by the application, terminate the application for a specified time associated with a disk access overuse threshold associated with the application.

12. The computing device of claim 11, wherein to compare the respective disk access usage of the flash memory by each of the plurality of applications with the respective application-specific disk access overuse threshold to determine the disk access overuse of the flash memory by the application, the one or more processors are further configured to:
compare a disk access usage of the flash memory by the application with the disk access overuse threshold associated with the application; and
in response to determining that the disk access usage of the flash memory by the application exceeds the disk access overuse threshold associated with the application, determine the disk access overuse of the flash memory by the application.

13. The computing device of claim 12, wherein the one or more processors are further configured to:
determine an application state of the application; and
determine, based at least in part on the application state of the application, the disk access overuse threshold associated with the application from a plurality of disk access overuse thresholds associated with the application.

14. The computing device of claim 12, wherein the one or more processors are further configured to:
 determine an operating mode of the computing device; and
 determine, based at least in part on the operating mode of the computing device, the disk access overuse threshold associated with the application from a plurality of disk access overuse thresholds associated with the application.

15. The computing device of claim 11, wherein:
 the respective application-specific disk access overuse threshold of each of the plurality of applications is associated with a specified time period; and
 the respective disk access usage of the flash memory by each of the plurality of applications is the respective disk access usage of the flash memory within the specified time period by each of the plurality of applications.

16. The computing device of claim 11, wherein to determine the respective disk access usage of the flash memory of the computing device by each of the plurality of applications, the one or more processors are further configured to:
 determine an occurrence of a system-wide disk access overuse condition; and
 in response to determining the occurrence of the system-wide disk access overuse condition, determine the respective disk access usage of the flash memory of the computing device by each of the plurality of applications.

17. The computing device of claim 16, wherein to determine the occurrence of the system-wide disk access overuse condition, the one or more processors are further configured to:
 determine that an aggregate amount of disk usage of the flash memory exceeds a specified threshold over a specified time period; and
 in response to determining that the aggregate amount of disk usage of the flash memory exceeds the specified threshold over the specified time period, determine the occurrence of the system-wide disk access overuse condition.

18. The computing device of claim 11, wherein to terminate the application, the one or more processors are further configured to:
 in response to determining the disk access overuse of the flash memory by the application, determine that a display of the computing device is turned off; and
 in response to determining that the display of the computing device is turned off, terminate the application.

19. The computing device of claim 11, wherein to terminate the application, the one or more processors are further configured to:
 in response to determining that the disk access overuse of the flash memory by the application, determine that a display of the computing device is not turned off;
 in response to determining that the display of the computing device is not turned off, determine that the application is not a foreground application; and
 in response to determining that the application is not the foreground application, terminate the application.

20. A non-transitory computer-readable storage medium having stored thereon instructions that, when executed, cause one or more processors of a computing device to:
 determine a respective disk access usage of flash memory of the computing device by each of a plurality of applications based at least in part on periodically polling disk input/output statistics associated with the flash memory, wherein the respective disk access usage of the flash memory of the computing device corresponds to an amount of writes by a corresponding application to the flash memory of the computing device, and wherein the disk input/output statistics are stored in the flash memory;
 compare the respective disk access usage of the flash memory by each of the plurality of applications with a respective application-specific disk access overuse threshold to determine disk access overuse of the flash memory by an application of the plurality of applications; and
 in response to determining the disk access overuse of the flash memory by the application, terminate the application for a specified time associated with a disk access overuse threshold associated with the application.

* * * * *